US010652500B2

(12) United States Patent
Chaudhri

(10) Patent No.: US 10,652,500 B2
(45) Date of Patent: *May 12, 2020

(54) DISPLAY OF VIDEO SUBTITLES

(71) Applicant: Apple Inc., Cupertino, CA (US)

(72) Inventor: Imran A. Chaudhri, San Francisco, CA (US)

(73) Assignee: Apple Inc., Cupertino, CA (US)

(*) Notice: Subject to any disclaimer, the term of this patent is extended or adjusted under 35 U.S.C. 154(b) by 8 days.

This patent is subject to a terminal disclaimer.

(21) Appl. No.: 15/889,853

(22) Filed: Feb. 6, 2018

(65) Prior Publication Data

US 2018/0167576 A1 Jun. 14, 2018

Related U.S. Application Data

(63) Continuation of application No. 15/431,635, filed on Feb. 13, 2017, now Pat. No. 10,003,764, which is a continuation of application No. 11/849,987, filed on Sep. 4, 2007, now Pat. No. 9,602,757.

(51) Int. Cl.
H04N 5/445 (2011.01)
H04N 7/01 (2006.01)
H04N 21/488 (2011.01)
H04N 21/414 (2011.01)
H04N 21/485 (2011.01)
H04N 5/44 (2011.01)

(52) U.S. Cl.
CPC ....... *H04N 5/44513* (2013.01); *H04N 5/4403* (2013.01); *H04N 5/445* (2013.01); *H04N 5/44504* (2013.01); *H04N 7/0122* (2013.01); *H04N 21/41407* (2013.01); *H04N 21/4858* (2013.01); *H04N 21/4884* (2013.01); *H04N 2005/44526* (2013.01)

(58) Field of Classification Search
None
See application file for complete search history.

(56) References Cited

U.S. PATENT DOCUMENTS

| 5,249,049 A | 9/1993 | Kranawetter et al. |
| 6,323,846 B1 | 11/2001 | Westerman et al. |
| 6,340,992 B1 | 1/2002 | Markandey |
| 6,535,688 B1* | 3/2003 | Kawamura ......... G11B 27/034 348/E5.108 |
| 6,570,557 B1 | 5/2003 | Westerman et al. |
| 6,677,932 B1 | 1/2004 | Westerman |

(Continued)

FOREIGN PATENT DOCUMENTS

| JP | 2005-115607 A | 4/2005 |
| WO | 2009/032639 A1 | 3/2009 |

OTHER PUBLICATIONS

U.S. Provisional Patent Application filed Jun. 22, 2007, for "Multiplexed Data Stream Protocol", U.S. Appl. No. 60/945,904.

(Continued)

Primary Examiner — Heather R Jones
(74) Attorney, Agent, or Firm — Invoke

(57) ABSTRACT

Methods, systems, and apparatus, including computer program products, for presenting subtitles. A video is played on a display of a device. A display mode for the video is detected. A subtitle is presented in one of a plurality of presentation formats based on the detected display mode.

16 Claims, 12 Drawing Sheets

(56) References Cited

U.S. PATENT DOCUMENTS

| | | |
|---|---|---|
| 6,888,536 B2 | 5/2005 | Westerman et al. |
| 7,224,401 B2 | 5/2007 | Ackley et al. |
| 8,792,054 B2 | 7/2014 | Mountain |
| 2003/0025833 A1 | 2/2003 | Mountain |
| 2004/0212731 A1 | 10/2004 | Sie et al. |
| 2005/0008347 A1 | 1/2005 | Jung et al. |
| 2006/0002684 A1* | 1/2006 | Champel .............. G11B 27/105 |
| | | 386/243 |
| 2006/0061687 A1 | 3/2006 | Dunton |
| 2006/0251406 A1 | 11/2006 | Tseng et al. |
| 2006/0274203 A1* | 12/2006 | Naganuma .............. G09G 5/00 |
| | | 348/554 |
| 2007/0071411 A1 | 3/2007 | Seo et al. |
| 2007/0147798 A1 | 6/2007 | Chang |
| 2007/0166005 A1 | 7/2007 | Berstis et al. |
| 2009/0060452 A1 | 3/2009 | Chaudhri |
| 2011/0019087 A1 | 1/2011 | Chao et al. |
| 2013/0209058 A1 | 8/2013 | Cho et al. |

OTHER PUBLICATIONS

U.S. Patent Application filed Jun. 22, 2007, for "Device Activation and Access", U.S. Appl. No. 11/767,447.

\* cited by examiner

DISPLAY OF VIDEO SUBTITLES

CROSS-REFERENCE TO RELATED APPLICATIONS

This application is a continuation of U.S. patent application Ser. No. 15/431,635, filed Feb. 13, 2017, which is a continuation of U.S. patent application Ser. No. 11/849,987 filed Sep. 4, 2007, now U.S. Pat. No. 9,602,757, the content of which is herein incorporated by reference in its entirety.

BACKGROUND

The subject matter of this specification relates generally to electronic media.

A video can include subtitles or closed captions. The subtitles or closed captions can provide a translation or a transcript of the spoken dialogue in a video and optionally other information. Subtitles and closed captions are useful, among other reasons, to users who are hard of hearing, are attempting to learn a language by watching a video in that language, or re attempting to watch a video in a noisy environment.

The subtitles and closed captions can obscure video content when displayed. When the display screen is relatively small, the allocation of screen space to the video content and to the subtitles can become a challenge.

SUMMARY

In general, one aspect of the subject matter described in this specification can be embodied in methods that include playing a video on a display of a device; detecting a display mode for the video; and presenting a subtitle in one of a plurality of presentation formats based on the detected display mode. Other embodiments of this aspect include corresponding systems, apparatus, computer program products, and computer readable media.

In general, another aspect of the subject matter described in this specification can be embodied in methods that include determining a display mode for a video on a device, where the display mode is one of a plurality of display modes for the device; determining a subtitle presentation format based on the display mode, where the subtitle presentation format is one of a plurality of subtitle presentation formats associated with the plurality of display modes; and presenting a subtitle for the video on the device according to the subtitle presentation format. Other embodiments of this aspect include corresponding systems, apparatus, computer program products, and computer readable media.

Particular embodiments of the subject matter described in this specification can be implemented to realize one or more of the following advantages. Subtitles or closed captioning can be displayed with videos played on portable devices in a way that reduces obstruction of the video content. Subtitles can be displayed in a matte region or overlaid over the video content automatically.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements

DETAILED DESCRIPTION

Example Mobile Device

Figure 1A:
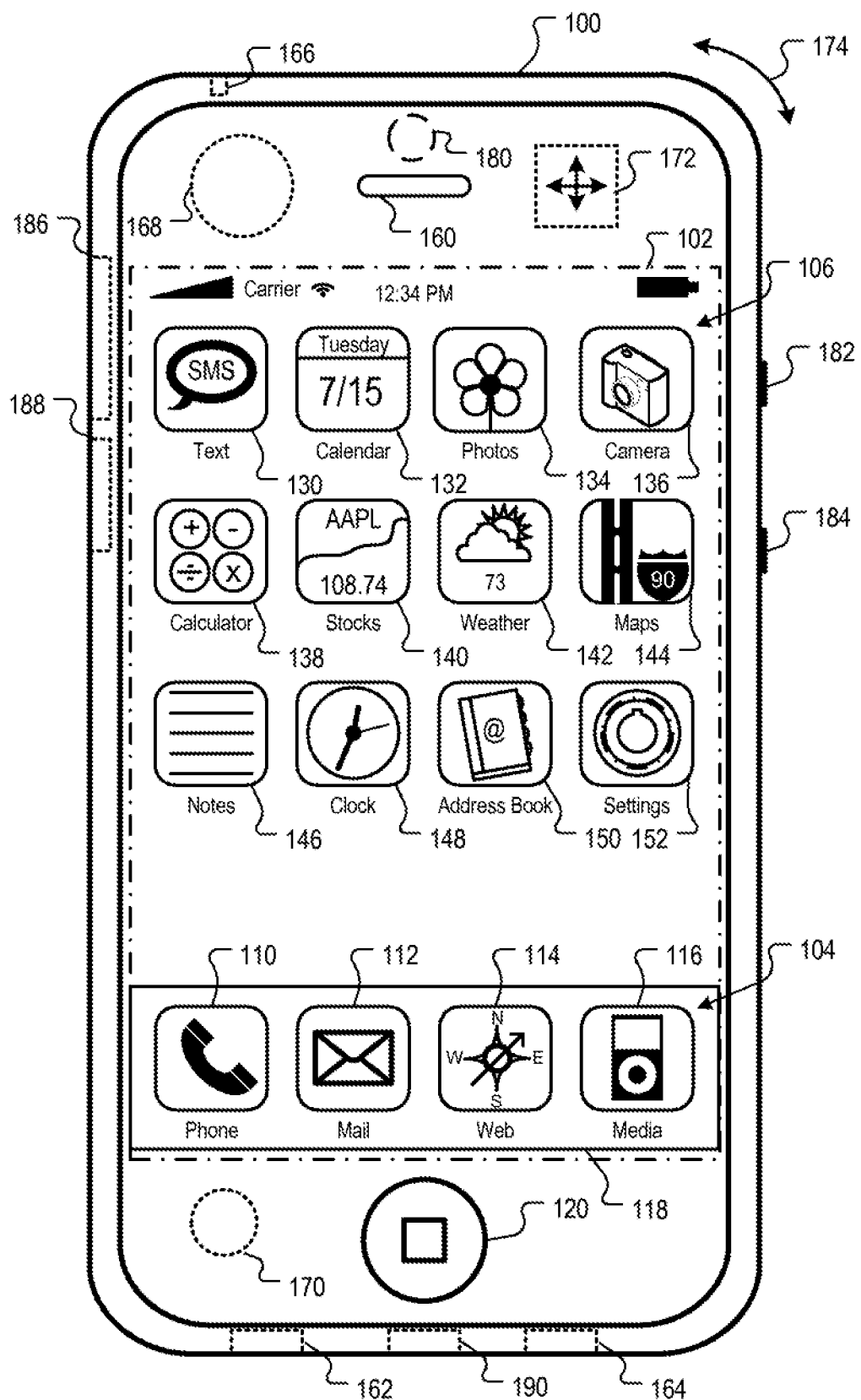
FIG. 1A is a block diagram of an example mobile device with telephony capability.

FIG. 1A is a block diagram of an example mobile device 100. The mobile device 100 can be, for example, a handheld computer, a personal digital assistant, a cellular telephone, a network appliance, a camera, a smart phone, an enhanced general packet radio service (EGPRS) mobile phone, a network base station, a media player, a navigation device, an email device, a game console, or a combination of any two or more of these data processing devices or other data processing devices.

Mobile Device Overview

In some implementations, the mobile device 100 includes a touch-sensitive display 102. The touch-sensitive display 102 can implement liquid crystal display (LCD) technology, light emitting polymer display (LPD) technology, or some other display technology. The touch-sensitive display 102 can be sensitive to haptic and/or tactile contact with a user.

In some implementations, the touch-sensitive display 102 can comprise a multi-touch-sensitive display 102. A multi-touch-sensitive display 102 can, for example, process multiple simultaneous touch points, including processing data related to the pressure, degree, and/or position of each touch point. Such processing facilitates gestures and interactions with multiple fingers, chording, and other interactions. Other touch-sensitive display technologies can also be used, e.g., a display in which contact is made using a stylus or other pointing device. Some examples of multi-touch-sensitive display technology are described in U.S. Pat. Nos. 6,323,846, 6,570,557, 6,677,932, and 6,888,536, each of which is incorporated by reference herein in its entirety.

In some implementations, the mobile device 100 can display one or more graphical user interfaces on the touch-sensitive display 102 for providing the user access to various system objects and for conveying information to the user. In some implementations, the graphical user interface can include one or more display objects 104 106. In the example shown, the display objects 104, 106 are graphic representations of system objects. Some examples of system objects include device functions, applications, windows, files, alerts, events, or other identifiable system objects.

Example Mobile Device Functionality

In some implementations, the mobile device 100 can implement multiple device functionalities, such as a telephony device, as indicated by a phone object 110; an e-mail device, as indicated by the e-mail object 112; a network data communication device, as indicated by the Web object 114; a Wi-Fi base station device (not shown); and a media processing device, as indicated by the media player object 116. In some implementations, particular display objects 104, e.g., the phone object 110, the e-mail object 112, the Web object 114, and the media player object 116, can be displayed in a menu bar 118. In some implementations, device functionalities can be accessed from atop-level graphical user interface, such as the graphical user interface illustrated in FIG. 1A. Touching one of the objects 110, 112, 114, or 116 can, for example, invoke corresponding functionality.

In some implementations, the mobile device 100 can implement network distribution functionality. For example, the functionality can enable the user to take the mobile device 100 and provide access to its associated network while traveling, in particular, the mobile device 100 can, extend Internet access (e.g., Wi-Fi) to other wireless devices in the vicinity. For example, mobile device 100 can be configured as a base station for one or more devices. AN such, mobile device 100 can grant or deny network access to other wireless devices.

In some implementations, upon invocation of device functionality, the graphical user interface of the mobile device 100 changes, or is augmented or replaced with another user interface or user interface elements, to facilitate user access to particular functions associated with the corresponding device functionality. For example, in response to a user touching the phone object 110, the graphical user interface of the touch-sensitive display 102 may present display objects related to various phone functions; likewise, touching of the email object 112 may cause the graphical user interface to present, display objects related to various e-mail functions; touching the Web object 114 may cause the graphical user interface to present display objects related to various Web-surfing functions; and touching the media player object 116 may cause the graphical user interface to present display objects related to various media processing functions.

In some implementations, the top-level graphical user interface environment or state of FIG. 1A can be restored by pressing a button 120 located near the bottom of the mobile device 100. In some implementations, each corresponding device functionality may have corresponding "home" display objects displayed on the touch-sensitive display 102 and the graphical user interface environment of FIG. 1A can be restored by pressing the "home" display object.

In some implementations, the top-level graphical user interface can include additional display objects 106, such as a short messaging service (SMS) object 130, a calendar object 132, a photos object 134, a camera object 136, a calculator object 138, a stocks object 140, a weather object 142, a maps object 144, a notes object 146, a clock object 148, an address book object 150, and a settings object 152. Touching the SMS display object 130 can, for example, invoke an SMS messaging environment and supporting functionality; likewise, each selection of a display object 132, 134, 136, 138, 140, 142, 144, 146, 148, 150, and 152 can invoke a corresponding object environment and functionality.

Additional and/or different display objects can also be displayed in the graphical user interface of FIG. 1A. For example if the device 100 is functioning as a base station for other devices, one or more "connection" objects may appear in the graphical user interface to indicate the connection, in some implementations, the display objects 106 can be configured by a user, e.g., a user may specify which display objects 106 are displayed, and/or may download additional applications or other software that provides other functionalities and corresponding display objects.

In some implementations, the mobile device 100 can include one or more input/output (I/O) devices and/or sensor devices. For example, a speaker 160 and a microphone 162 can be included to facilitate voice-enabled functionalities, such as phone and voice mail functions. In some implementations, an up/down button 184 for volume control of the speaker 160 and the microphone 162 can be included. The mobile device 100 can, also include an on/off button 182 for a ring indicator of incoming phone calls. In some implementations, a loud speaker 164 can be included to facilitate hands-free voice functionalities, such as speaker phone functions. An audio jack 166 can also be included for use of headphones and/or a microphone.

In some implementations, a proximity sensor 168 can be included to facilitate the detection of the user positioning the mobile device 100 proximate to the user's ear and, in response, to disengage the touch-sensitive display 102 to prevent accidental function invocations. In some implementations, the touch-sensitive display 102 can be turned off to conserve additional power when the mobile device 100 is proximate to the user's ear.

Other sensors can also be used. For example, in some implementations, an ambient light sensor 170 can be utilized to facilitate adjusting the brightness of the touch-sensitive display 102. In some implementations, an accelerometer 172 can be utilized to detect movement of the mobile device 100, as indicated by the directional arrow 174. Accordingly, display objects and/or media can be presented according to a detected orientation, e.g., portrait or landscape. In some implementations, the mobile device 100 may include circuitry and sensors for supporting a location determining capability, such as that provided by the global positioning system (GPS) or other positioning systems (e.g., systems using Wi-Fi access points, television signals, cellular grids, Uniform Resource Locators (URLs)). In some, implementations, a positioning system (e.g., a GPS receiver) can be integrated into the mobile device 100 or provided as a separate device that can be coupled to the mobile device 100 through an interface (e.g., port device 190) to provide access to location-based services.

In some implementations, a port device 190, e.g., a Universal Serial Bus (USB) port, or a docking port, or some other wired port connection, can be included. The port device 190 can, for example, be utilized to establish a wired connection to other computing devices, such as other communication devices 100, network access devices, a personal computer, a printer, a display screen, or other processing devices capable of receiving and/or transmitting data. In some implementations, the port device 190 allows the mobile device 100 to synchronize with a host device using one or more protocols, such as, for example, the TCP/IP, FTTP, UDP and any other known protocol. In some implementations, a TCP/IP over USB protocol can be used, as described in U.S. Provisional Patent Application No. 60/945,904, filed Jun. 22, 2007, for "Multiplexed Data Stream Protocol," which provisional patent application is incorporated by reference herein in its entirety.

The mobile device 100 can also include a camera lens and sensor 180. In some implementations, the camera lens and sensor 180 can be located on the back surface of the mobile device 100. The camera can capture still images and/or video.

The mobile device 100 can also include one or more wireless communication subsystems, such as an 802.11b/g communication device 186, and/or a Bluetooth™ communication device 188. Other communication protocols can also be supported, including other 802.x communication protocols (e.g., WiMax, Wi-Fi, 3G), code division multiple access (CDMA), global system for mobile communications (GSM), Enhanced Data GSM Environment (EDGE), etc.

Example Mobile Device

Figure 1B:
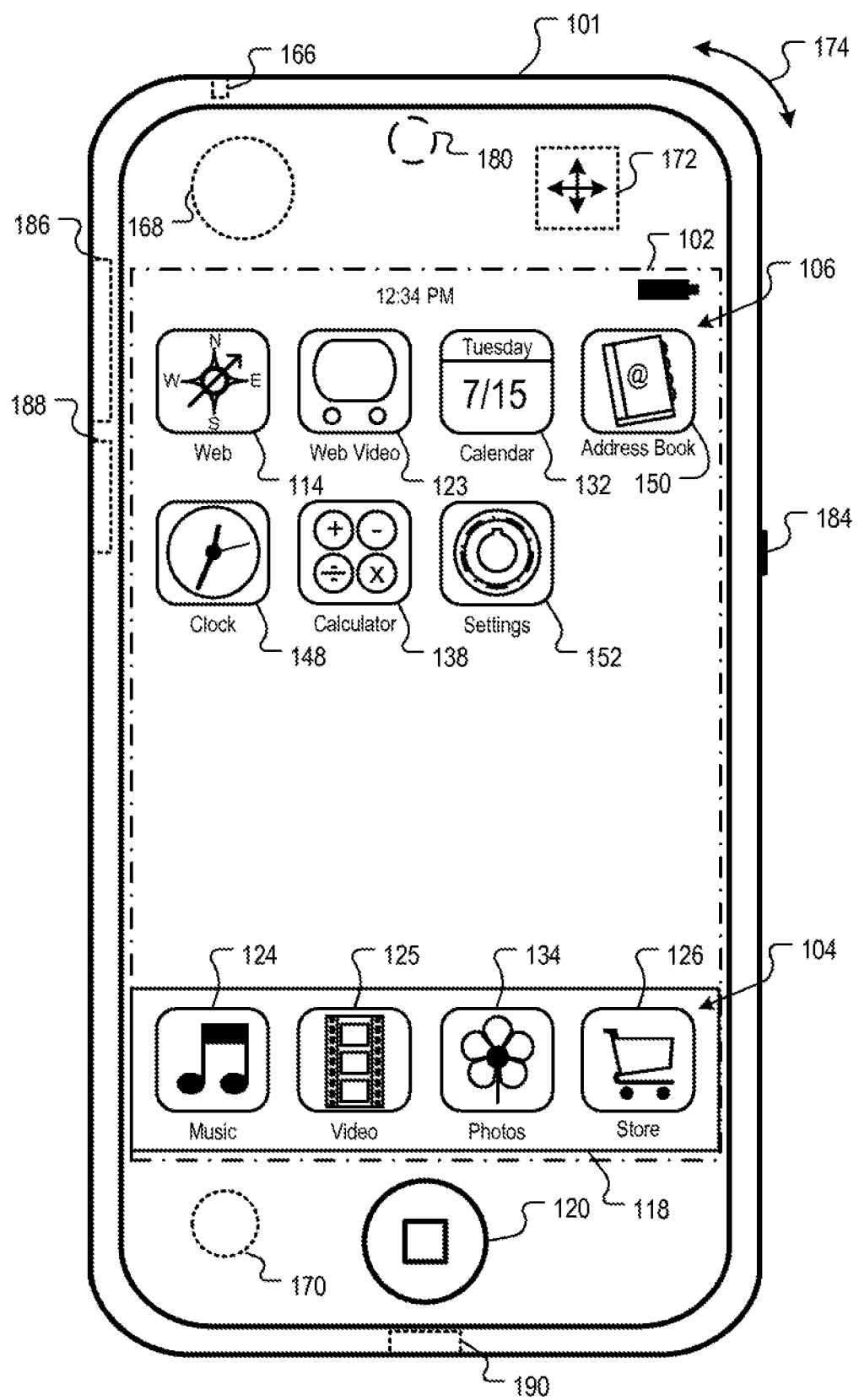
FIG. 1B is a block diagram of an example mobile device without telephony capability.

FIG. 1B is a block diagram of an example mobile device 101. The mobile device 101 can be, for example, a handheld computer, a laptop computer, a personal digital assistant, a network appliance, a camera, a network base station, a media player, a navigation device, an email device, a game console, or a combination of any two or more of these data processing devices or other data processing devices. In some implementations, device 101 shown in FIG. 1B is an example of how device 100 can be configured to display a different set of objects. In some implementations, device 101 has a different set of device functionalities than device 100 shown in FIG. 1A, but otherwise operate in a similar manner to device 100.

Mobile Device Overview

In some implementations, the mobile device 101 includes a touch-sensitive display 102, which can be sensitive to haptic and/or tactile contact with a user. In some implementations, the mobile device 101 can display one or more graphical user interfaces on the touch-sensitive display 102 for providing the user access to various system objects and for conveying information to the user.

Mobile Device Functionality

In some implementations, the mobile device 101 can implement multiple device functionalities, such as a music processing device, as indicated by the music player object 124, a video processing device, as indicated by the video player object 125, a digital photo album device, as indicated by the photos object 134, and a network data communication device for online shopping, as indicated by the store object 126. In some implementations, particular display objects 104, e.g., the music player object 124, the video player object 125, the photos object 134, and store object 126, can be displayed in a menu bar 118. In some implementations, device functionalities can be accessed from a top-level graphical user interface, such as the graphical user interface illustrated in FIG. 1B. Touching one of the objects 124, 125, 134, or 126 can, for example, invoke corresponding functionality.

In some implementations, the top-level graphical user interface of mobile device 101 can include additional display objects 106, such as the Web object 114, the calendar object 132, the address book object 150, the clock object 148, the calculator object 138, and the settings object 152 described above with reference to mobile device 100 of FIG. 1A. In some implementations, the top-level graphical user interface can include other display objects, such as a Web video object 123 that provides functionality for uploading and playing videos on the Web. Each selection of a display object 114, 123, 132, 150, 148, 138, and 152 can invoke a corresponding object environment and functionality.

Additional and/or different display objects can also be displayed in the graphical user interface of FIG. 1B. In some implementations, the display objects 106 can be configured by a user. In some implementations, upon invocation of device functionality, the graphical user interface of the mobile device 101 changes, or is augmented or replaced with another user interface or user interface elements, to facilitate user access to particular functions associated with the corresponding device functionality.

In some implementations, the mobile device 101 can include audio jack 166, a volume control device 184, sensor devices 168, 170, 172, and 180, wireless communication subsystems 186 and 188, and a port device 190 or some other wired port connection described above with reference to mobile device 100 of FIG. 1A.

Network Operating Environment

Figure 2:
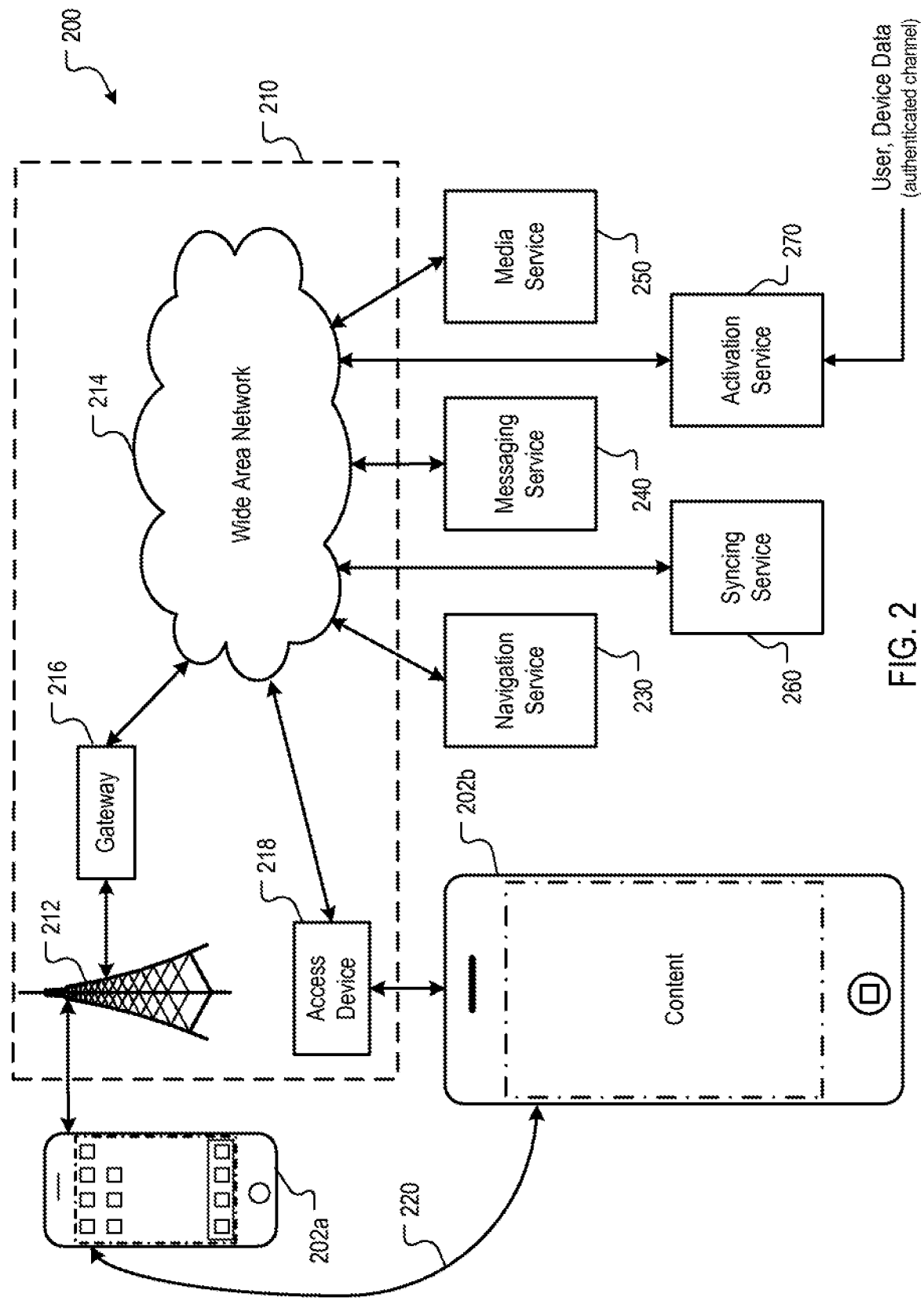
FIG. 2 is a block diagram of an example network operating environment for the mobile devices of FIGS. 1A-1B.

FIG. 2 is a block diagram of an example network operating environment 200. In. FIG. 2, mobile devices 202*a* and 202*b* each can represent mobile device 100 or 101. Mobile devices 202*a* and 202*b* can, for example, communicate over one or more wired and/or wireless networks 210 in data communication. For example, a wireless network 212, e.g., a cellular network, can communicate with a wide area network (WAN) 214, such as the Internet, by use of a gateway 216. Likewise, an access device 218, such as an 802.11g wireless access device, can provide communication access to the wide area network 214. In some implementations, both voice and data communications can be established over the wireless network 212 and the access device 218. For example, the mobile device 202*a* can place and receive phone calls (e.g., using VoIP protocols), send and receive e-mail messages (e.g., using POP3 protocol), and retrieve electronic documents and/or streams, such as web pages, photographs, and videos, over the wireless network 212, gateway 216, and wide area network 214 (e.g., using TCP/IP or UDP protocols). Likewise, in some implementations, the mobile device 202*b* can place and receive phone calls send and receive e-mail messages, and retrieve electronic documents over the access device 218 and the wide area network 214. In some implementations, the mobile device 202*a* or 202*b* can be physically connected to the access device 218 using one or more cables and the access device 218 can be a personal computer. In this configuration, the mobile device 202*a* or 202*b* can be referred to as a "tethered" device.

The mobile devices 202*a* and 202*b* can also establish communications by other means. For example, the wireless device 202*a* can communicate with other wireless devices, e.g., other mobile devices 202*a* or 202*b*, cell phones, etc., over the wireless network 212. Likewise, the mobile devices 202*a* and 202*b* can establish peer-to-peer communications 220, e.g., a personal area network, by use of one or more communication subsystems, such as the Bluetooth™ communication devices 188 shown in FIGS. 1A-1B. Other communication protocols and topologies can also be implemented.

The mobile device 202a or 202b can, for example, communicate with one or more services 230, 240, 250, 260, and 270 over the one or more wired and/or wireless networks 210. For example, a navigation service 230 can provide navigation information, e.g., map information, location information, route information, and other information, to the mobile device 202a or 202b. A user of the mobile device 202b can invoke a map functionality, e.g., by pressing the maps object 144 on the top-level graphical user interface shown in FIG. 1A, and can request and receive a map for a particular location.

A messaging service 240 can, for example, provide e-mail and/or other messaging services. A media service 250 can, for example, provide access to media files, such as song files, audio books, movie files, video clips, and other media data. In some implementations, separate audio and video services (not shown) can provide access to the respective types of media files. A syncing service 260 can, for example, perform syncing services (e.g., sync files). An activation service 270 can, for example, perform an activation process for activating the mobile device 202a or 202b. Other services can also be provided, including a software update service that automatically determines whether software updates exist for software on the mobile device 202a or 202b, then downloads the software updates to the mobile device 202a or 202b where the software updates can be manually or automatically unpacked and/or installed.

The mobile device 202a or 202b can also access other data and content over the one or more wired and/or wireless networks 210. For example, content publishers, such as news sites, RSS feeds, web sites, blogs, social networking sites, developer networks, etc., can be accessed by the mobile device 202a or 202b. Such access can be provided by invocation of a web browsing function or application (e.g., a browser) in response to a user touching the Web object 114.

Example Mobile Device Architecture

Figure 3:
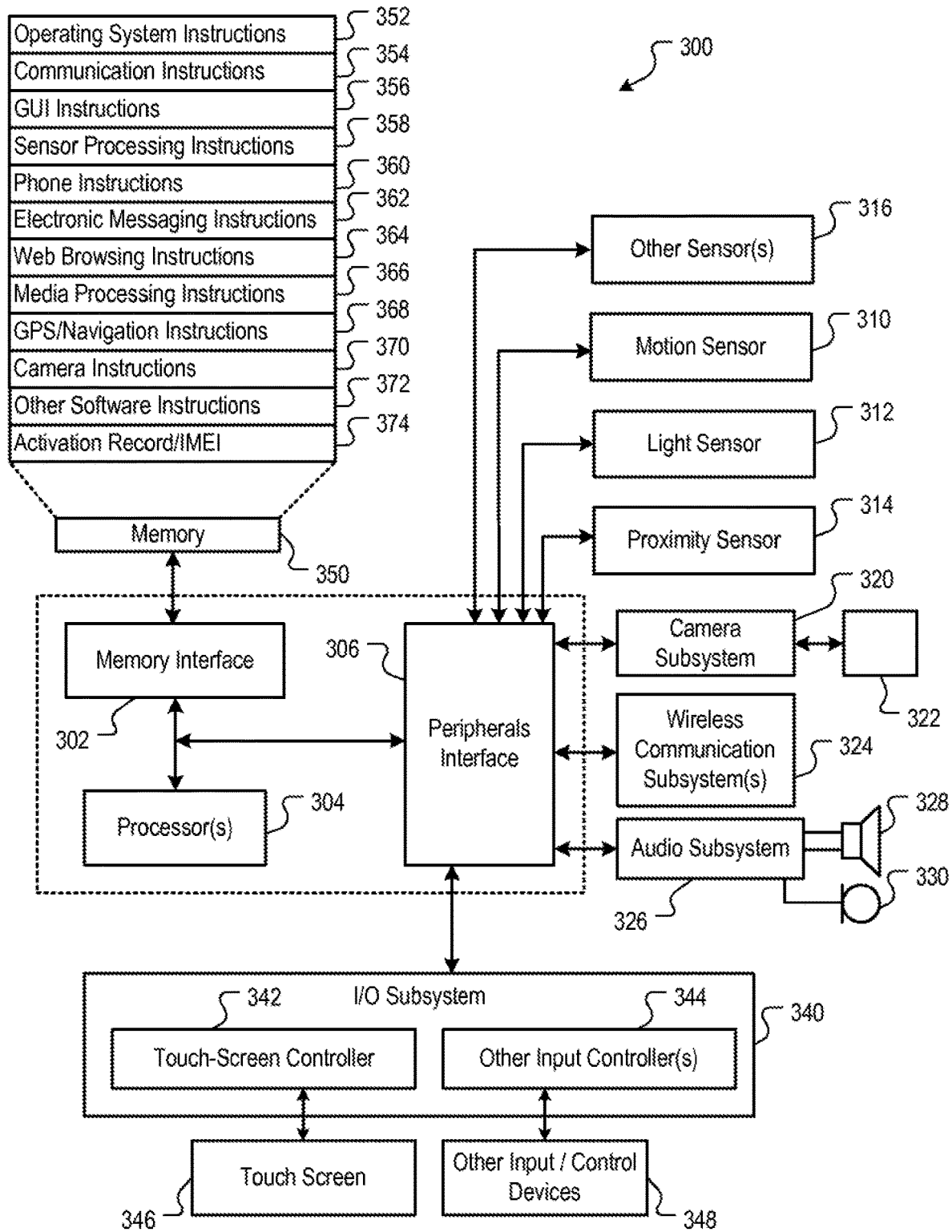
FIG. 3 is a block diagram of an example implementation of the mobile devices of FIGS. 1A-1B.

FIG. 3 is a block diagram 300 of an example implementation of the mobile devices 100 and 101 of FIGS. 1A-1B, respectively. The mobile device 100 or 101 can include a memory interface 302, one or more data processors, image processors and/or central processing units 304, and a peripherals interface 306. The memory interface 302, the one or more processors 304 and/or the peripherals interface 306 can be separate components or can be integrated in one or more integrated circuits. The various components in the mobile device 100 or 101 can be coupled by one or more communication buses or signal lines.

Sensors, devices, and subsystems can be coupled to the peripherals interface 306 to facilitate multiple functionalities. For example, a motion sensor 310, a light sensor 312, and a proximity sensor 314 can be coupled to the peripherals interface 306 to facilitate the orientation, lighting, and proximity functions described with respect to FIG. 1A. Other sensors 316 can also be connected to the peripherals interface 306, such as a positioning system (e.g., GPS receiver), a temperature sensor, a biometric sensor, or other sensing device, to facilitate related functionalities.

A camera subsystem 320 and an optical sensor 322, e.g., a charged coupled device (CCD) or a complementary metal-oxide semiconductor (CMOS) optical sensor, can be utilized to facilitate camera functions, such as recording photographs and video clips.

Communication functions can be facilitated through one or more wireless communication subsystems 324, which can include radio frequency receivers and transmitters and/or optical (e.g., infrared) receivers and transmitters. The specific design and implementation of the communication subsystem 324 can depend on the communication network(s) over which the mobile device 100 or 101 is intended to operate. For example, a mobile device 100 or 101 may include communication subsystems 324 designed to operate over a GSM network, a GPRS network, an EDGE network, a Wi-Fi or WiMax network, and a Bluetooth™ network. In particular the wireless communication subsystems 324 may include hosting protocols such that the device 100 or 101 may be configured as a base station for other wireless devices.

An audio subsystem 326 can be coupled to a speaker 328 and a microphone 330 to facilitate voice-enabled functions, such as voice recognition, voice replication, digital recording, and telephony functions.

The I/O subsystem 340 can include a touch screen controller 342 and/or other input controller(s) 344. The touch-screen controller 342 can be coupled to a touch screen 346. The touch screen 346 and touch screen controller 342 can, for example detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen 346.

The other input controller(s) 344 can be coupled to other input/control devices 348, such as one or more buttons, rocker switches, thumb-wheel, infrared port, USB port, and/or a pointer device such as a stylus. The one or more buttons (not shown) can include an up/down button for volume control of the speaker 328 and/or the microphone 330.

In one implementation, a pressing of the button for a first duration may disengage a lock of the touch screen 346; and a pressing of the button for a second duration that is longer than the first duration may turn power to the mobile device 100 or 101 on or off. The user may be able to customize a functionality of one or more of the buttons. The touch screen 346 can, for example, also be used to implement virtual or soft buttons and/or a keyboard.

In some implementations, the mobile device 100 or 101 can present recorded audio and/or video files, such as MP3, AAC, and MPEG files. In some implementations, the mobile device 100 or 101 can include the functionality of an MP3 player, such as an iPod™. The mobile device 100 or 101 may, therefore, include a 36-pin connector that is compatible with the iPod. Other input/output and control devices can also be used.

The memory interface 302 can be coupled to memory 350. The memory 350 can include high-speed random access memory and/or non-volatile memory, such as one or more magnetic disk storage devices, one or more optical storage devices, and/or flash memory (e.g., NAND, NOR). The memory 350 can store an operating system 352, such as Darwin, RTXC, LINUX, UNIX, OS X, WINDOWS, or an embedded operating system such as VxWorks. The operating, system 352 may include instructions for handling basic system services and for performing hardware dependent tasks. In some implementations, the operating system 352 can be a kernel (e.g., UNIX kernel), as described in reference to FIGS. 4A and 4B.

The memory 350 may also store communication instructions 354 to facilitate communicating with one or more additional devices, one or more computers and/or one or more servers. The memory 350 may include graphical user interface instructions 356 to facilitate graphic user interface processing; sensor processing instructions 358 to facilitate sensor-related processing and functions; phone instructions 360 to facilitate phone-related processes and functions; electronic messaging instructions 362 to facilitate electronic-messaging related processes and functions; web browsing instructions 364 to facilitate web browsing-related processes and functions; media processing instructions 366 to facilitate media processing-related processes and functions; GPS/Navigation instructions 368 to facilitate GPS and navigation-related processes and instructions; camera instructions 370 to facilitate camera-related processes and functions; and/or other software instructions 372 to facilitate other processes and functions, e.g., security processes and functions as described in reference to FIGS. 4A and 4B. The memory 350 may also store other software instructions (not shown), such as web video instructions to facilitate web video-related processes and functions; and/or web shopping, instructions to facilitate web shopping-related processes and functions. In some implementations, the media processing instructions 366 are divided into audio processing instructions and video processing instructions to facilitate audio processing-related processes and functions and video processing-related processes and functions, respectively. An activation record and International Mobile Equipment Identity (IMEI) 374 or, similar hardware identifier can also be stored in memory 350.

Each of the above identified instructions and applications can correspond to a set of instructions for performing one or more functions described above. These instructions need not be implemented as separate software programs, procedures, or modules. The memory 350 can include additional instructions or fewer instructions. Furthermore, various functions of the mobile device 100 or 101 may be implemented in hardware and/or in software, including in one or more signal processing and/or application specific integrated circuits.

Software Stack and Security Process

Figure 4A:
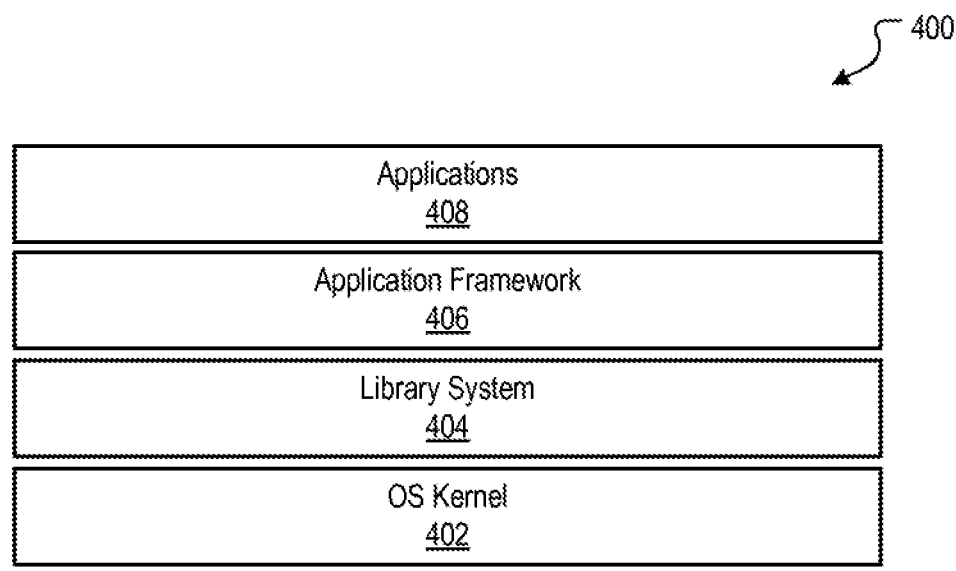
FIG. 4A illustrates an example implementation of a software stack for the mobile devices of FIGS. 1A-1B

FIG. 4A illustrates an example implementation of a software stack 400 for the mobile devices of FIGS. 1A-1B. In some implementations, the software stack 400 includes an operating system (OS) kernel 402 (e.g., a UNIX kernel), a library system 404, an application framework 406 and an applications layer 408.

The OS kernel 402 manages the resources of the mobile device 100 or 101 and allows other programs to run and use these resources. Some examples of resources include a processor, memory, and I/O. For example, the kernel 402 can determine which running processes should be allocated to a processor, processors or processor cores, allocates memory to the processes and allocates requests from applications and remote services to perform I/O operations. In some implementations, the kernel 402 provides methods for synchronization and inter-process communications with other devices.

In some implementations, the kernel 102 can be stored in non-volatile memory of the mobile device 100 or 101. When the mobile device 100 or 101 is turned on, a boot loader starts executing the kernel 102 in supervisor mode. The kernel then initializes itself and starts one or more processes for the mobile device 100 or 101, including a security process 410 for remote access management, as described in reference to FIG. 4B.

The library system 404 provides various services applications running in the application layer 408. Such services can include audio services, video services, database services, image processing services, graphics services, etc.

The application framework 406 provides an object-oriented application environment including classes and Application Programming Interfaces (APIs) that can be used by developers to build applications using well-known programming languages (e.g., Objective-C, Java).

The applications layer 408 is where various applications exist in the software stack 400. Developers can use the APIs and environment provided by the application framework 406 to build applications, such as the applications represented by the display objects 104, 106, shown in FIGS. 1A-1B (e.g., email, media player Web browser, phone, music player, video player, photos, and store).

Secure Communication Channel

Figure 4B:
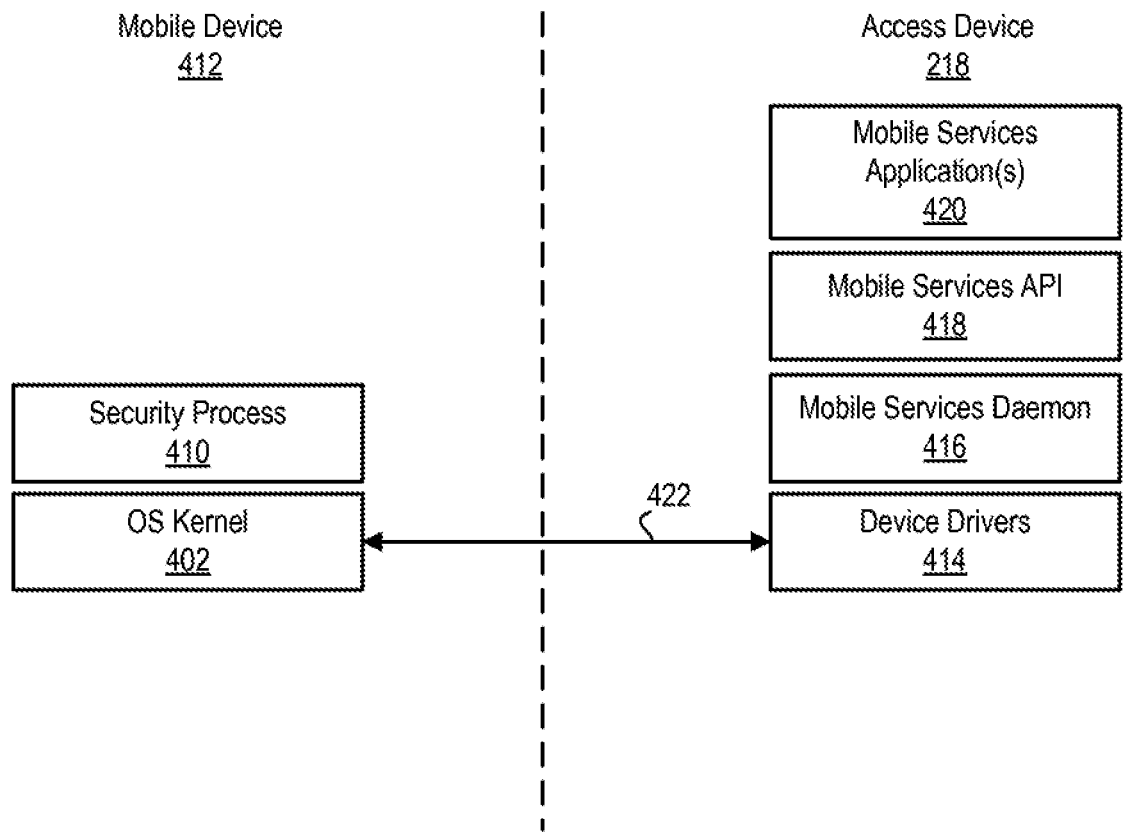
FIG. 4B illustrates an example implementation of a security process for remote access management over a secure communications channel.

FIG. 4B illustrates an example implementation of a security process 410 for remote access management over a secure communications channel 422. In the example shown, the mobile device 412, e.g., mobile device 100 or 101, is running the security process 410, which communicates with the OS kernel 402. Any remote access requests made to the kernel 402 are intercepted by the security process 410, which is responsible for setting up secure communication sessions between the mobile device 412 and a mobile services access device 218. In some implementations, the process 410 uses a cryptographic protocol, such as Secure Sockets Layer (SSL) or Transport Layer Security (TLS) to provide secure communications between the mobile device 412 and the access device 218. The access device 218 can be any device with network connectivity, including but not limited to: a personal computer, a hub, an Ethernet card, another mobile device, a wireless base station, etc. The secure communications channel can be a Universal Serial Bus (USB), Ethernet, a wireless link (e,g., Wi-Fi, WiMax, 3G), an optical link, infrared link, FireWire™, or any other known communications channel or media.

In the example shown, the access device 218 includes device drivers 414, a mobile services daemon 416, a mobile services API 418 and one or more mobile service applications 420. The device drivers 414 are responsible for implementing the transport layer protocol, such as TCP/IP over USB. The mobile services daemon 416 listens (e.g., continuously) to the communications channel 422 for activity and manages the transmission of commands and data over the communication channel 422. The mobile services API 418 provides a set of functions, procedures, variables and data structures for supporting requests for services made by the mobile services application 420. The mobile services application 420 can be a client program running on the access device 218, which provides one or more user interfaces for allowing a user to interact with a remote service (e.g., activation service 270) over a network (e.g., the Internet, wireless network, peer-to-peer network, optical network, Ethernet, intranet). In some implementations, a device activation process can be used, as described in co-pending U.S. patent application Ser. No. 11/767,447, filed Jun. 22, 2007, for "Device Activation and Access," which patent application is incorporated by reference herein in its entirety. The application 420 can allow a user to set preferences, download or update files of content or software, search databases, store user data, select services, browse content, perform financial transactions, or engage in any other online service or function. An example of a mobile services application 420 is the iTunes™ client, which is publicly available from Apple Inc. (Cupertino, Calif.). An example of a mobile device 412 that uses the iTunes™ client is the iPod™ product developed by Apple Inc. Another example of a mobile device 412 that uses the iTunes™ client is the iPhone™ product developed by Apple Inc.

In an example operational mode, a user connects the mobile device 412 to the access device 218 using, for example, a USB cable. In other implementations, the mobile device 412 and access device 218 include wireless transceivers for establishing a wireless link (e.g., Wi-Fi). The drivers 414 and kernel 408 detect the connection and alert the security process 410 and mobile services daemon 416 of the connections status. Once the connection is established certain non-sensitive information can be passed from the mobile device 412 to the access device 218 (e.g., name, disk size, activation state) to assist in establishing a secure communication session.

In some implementations, the security process 410 establishes a secure communication session (e.g., encrypted SSL session) with the access device 218 by implementing a secure network protocol. For example, if using SSL protocol, the mobile device 412 and access device 218 will negotiate a cipher suite to be used during data transfer, establish and share a session key, and authenticate the access device 218 to the mobile device 412. In some implementations, if the mobile device 412 is password protected, the security process 410 will not establish a session, and optionally alert the user of the reason for failure.

Once a secure session is successfully established, the mobile device 412 and the access device 218 can exchange sensitive information (e.g., passwords, personal information), and remote access to the mobile device 412 can be granted to one or more services (e.g., navigation service 230, messaging service 240, media service 250, syncing service 260, activation service 270). In some implementations, the mobile services daemon 416 multiplexes commands and data for transmission over the communication channel 422. This multiplexing allows several remote services to have access to the mobile device 412 in a single session without the need to start a new session (or handshaking) for each service requesting access to the mobile device 412.

Subtitle Display for Playing Video

Figure 5:
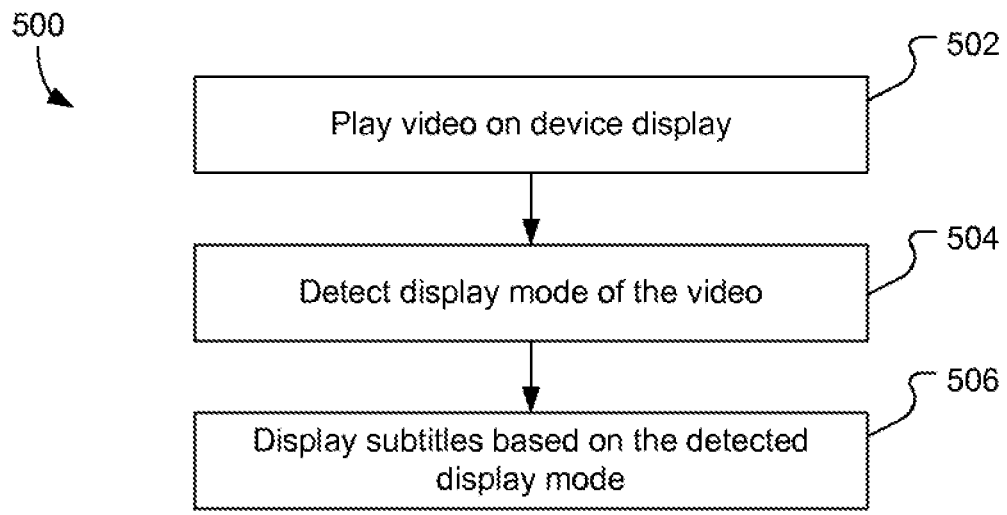
FIG. 5 is an example flow chart of operations to display subtitles for video played on the mobile devices of FIGS. 1A-1B.

FIG. 5 is an example flow chart of operations 500 that can be performed to display subtitles for video playing on a device. The device, for example, can be mobile device 100 or 101 of FIGS. 1A-1B, some other mobile device, a computer, a television (TV), a DVD player, or some other device. In some implementations, the device can be any device, mobile or not, that has a relative small display screen. The operations 500 can be performed by a processor executing instructions stored in a computer program product, such as mobile device 100 or 101 executing media processing instructions 366. The operations 500 can begin in step 502 with a video playing on a display of a device. The video can, for example, be playing on a DVD player and displayed on a TV, be playing on the screen 102 of device 100 or 101, be playing locally on a computer or mobile device, be streaming from a server to a computer or mobile device, to name a few examples. The video can be played in response to user actions on the device.

Detecting a display mode for the video can be performed in step 504. The detection can be performed by the device displaying the video, such as mobile device 100 or 101, for example. In some implementations, the detection can be performed by media processing instructions 366 executing in mobile device 100 or 101. In some other implementations, the detection can be performed by a device streaming video to the display device, by a DVD player, by some other device, by the user, or by some other method. The display mode can be pan and scan, full screen wide screen, fit to width, fit to height, original aspect ratio, letterbox, or windowbox, to name a few examples.

In step 506 a video subtitle, caption, or closed caption is presented in accordance with the detected display mode. In some implementations, the video subtitle is presented overlaid on the video, or in a letterboxing or matte (black portion) below or above the video. The subtitle can, for example, be located in an upper portion, of the display, or a lower portion of the display. The subtitle can, for example, contain all audio content, only dialogue, all text displayed in the video, or some other content or combination of contents. Example subtitles 606, 704, 802, and 804 shown on the mobile device 100 are described in reference to FIGS. 6-9.

Figure 6:
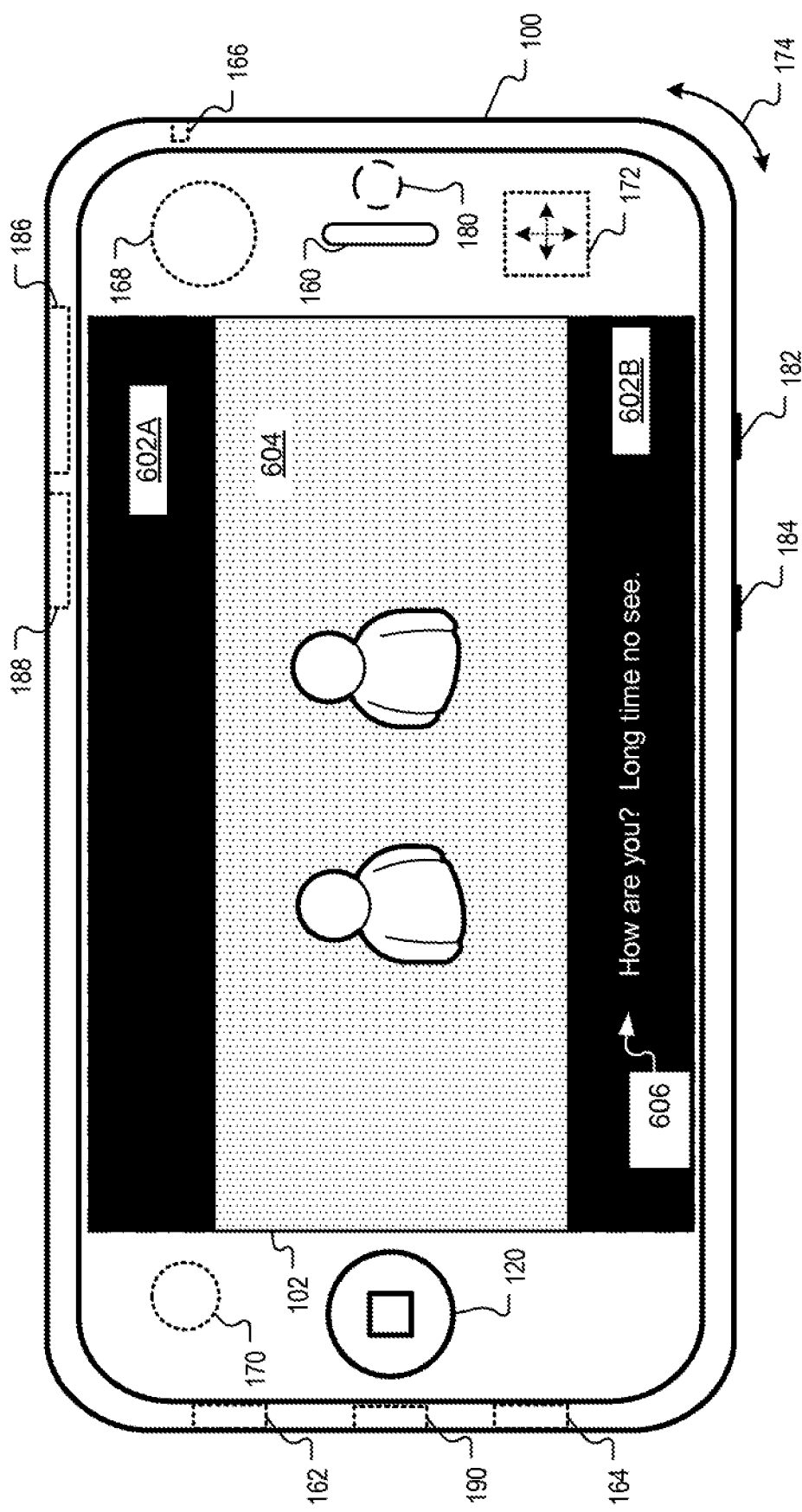
FIG. 6 illustrates an example of a letterboxed video with subtitles.

FIG. 6 illustrates an example of the mobile device 100 playing a letterboxed video with subtitles. For example, the letterbox display mode can be widescreen, original aspect ratio, or fit to width. In some implementations, video played by the user is detected to be displayed in the center of the display 102. This display mode can, for example, have mattes or black bars 602A and 602B above and below, respectively, video content 604 being played by the user. Continuing the example, subtitle 606 can be presented to the user on the matte 602B below the video content 604, allowing the user an unobstructed view of the video content 604. In other implementations, the subtitle 606 can be displayed in the matte 602A above the video content 604. More generally, the subtitle 606 can be displayed in a matte (e.g., matte 602A, 602B) that is positioned above or below the video content 604. For example, the subtitle can be displayed in the top matte 602A or the bottom matte 602B for a video played with letterboxing, or in the top or bottom matte for a video played with windowboxing.

In some implementations, the subtitle 606 is vertically and horizontally centered within the matte where the subtitle is displayed. For example, in FIG. 5, subtitle 606 is centered horizontally and vertically within matte 602B. In some other implementations, the subtitle 606 is horizontally centered within the matte 602A or 602B, but is aligned to be near the top or bottom side of matte 602A or 602B.

Figure 7:
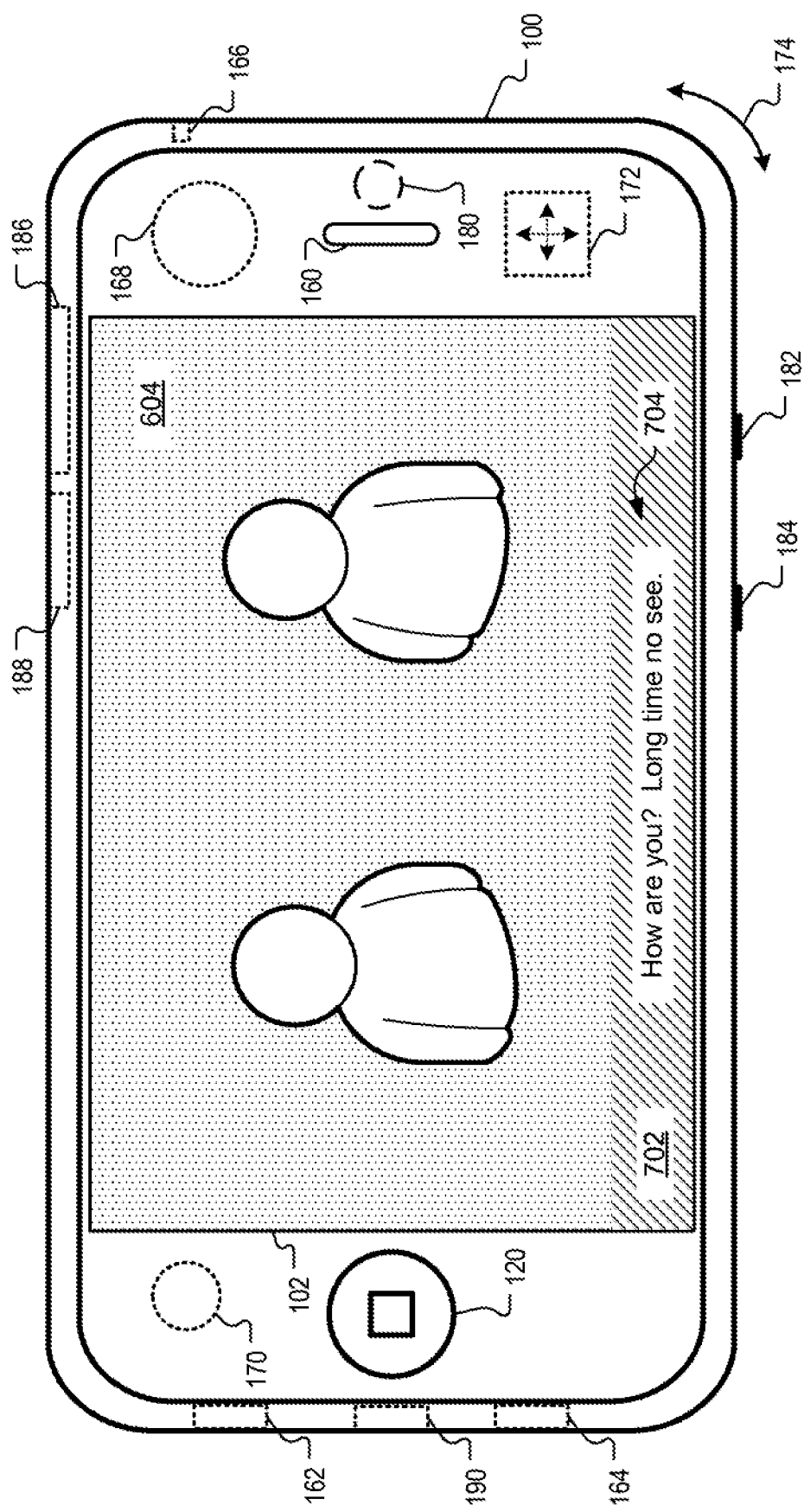
FIG. 7 illustrates an example of video in full screen mode with subtitles.

FIG. 7 illustrates an example of the mobile device 100 playing a video in full screen mode with overlaid subtitles. The full screen display mode can be pan and scan of a video having a 16:9 aspect ratio on a display with a 4:3 aspect ratio, or widescreen on a widescreen display, to name a few examples. In these implementations, the video played by the user is detected to fill the entire display 102 with video content 604. In this example, a transparent or translucent area 702 can be overlaid on the video content 604, and subtitle 704 is displayed in the transparent or translucent area 702. In some implementations, the transparent area 702 can be centered at the top of the display 102, centered at the bottom of the display 102, or in some other location. The subtitles can, for example, be colored, shadowed, outlined, or otherwise displayed such that the subtitles are not obscured by the video content 604.

More generally, the subtitle 704 can be displayed in a transparent area 702 overlaid on the video content 604 when the video content 604 is played in a mode that does not include a matte above or below the video content 604. Examples of such modes include fit to height mode, pillarboxing mode, and pan and scan mode for a video having a 16:9 aspect ratio on a display with a 4:3 aspect ratio, and so on.

Figure 8:
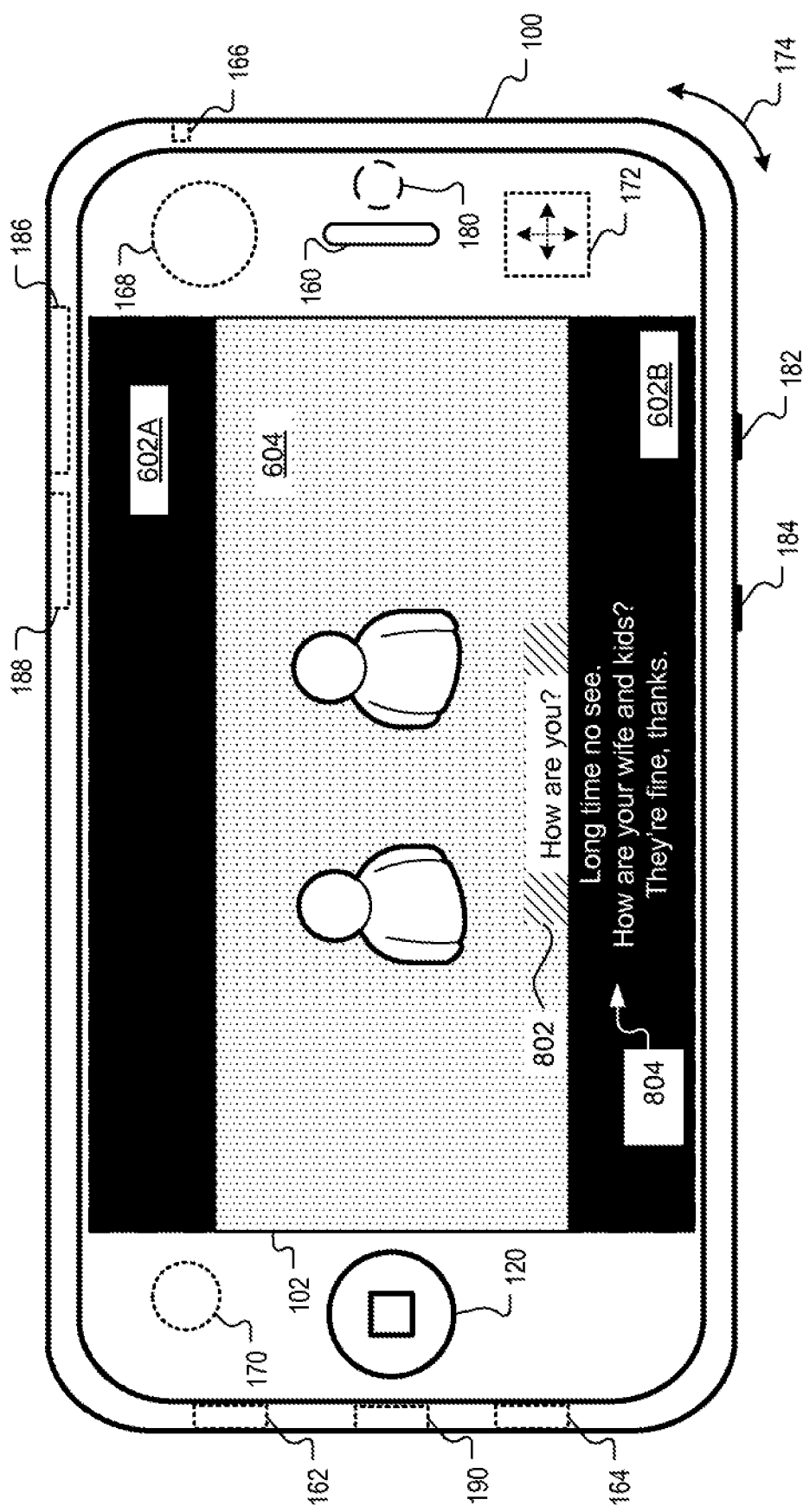
FIG. 8 illustrates an example of a letterboxed video with partially overlaid subtitles.

FIG. 8 illustrates an example of mobile device 100 playing a letterboxed video with partially overlaid subtitles. The display mode of the video can be widescreen, letterbox, or windowbox, to name a few examples. In these implementations, video content 604 is detected to be displayed in the center of display 102. Continuing the example, a transparent area 802 can be displayed directly above matte 602B. In this example, subtitles 804 can contain multiple lines of text to be displayed. In order to present subtitles 804 on the display 102 some of the lines of subtitles 804 can, for example, be displayed in transparent area 802. The number of lines of subtitles 804 presented in transparent area 802 can, for example, be half of the total lines of subtitles 804; the lines of subtitles 804 not able to fit into the matte 602B; or some other amount such as half of a line. In this example, when all of the lines of subtitles 804 are able to fit in the matte 602B, the subtitles 804 can be presented only in the matte 602B. The subtitles presented in transparent area 802 can, for example, be colored, shadowed, outlined, or otherwise displayed such that the subtitles are not obscured by the video content 604.

In some other implementations, lines of subtitles 804 that are not able to fit into the matte are not displayed. As the video content 604 is played, the lines of subtitles can shift within the matte to hide subtitle lines that correspond to content (e.g., speech) in the video content 604 that are earlier in time position, and to display subtitle lines that correspond to content in the video content 604 that are later in time position. For example, video content 604 can include a scene that has the subtitle lines "How are you?", "Long time no see.", "How are your wife and kids?", and "They're fine, thanks." in that time position order. When playback of the video content 604 reaches the scene, the line "They're fine, thanks." is not displayed because it is the later in time of the four lines. As playback of the video content 604 proceeds, the lines can shift to hide the line "How are you?" and to display the line "They're fine, thanks." In other words, the subtitles automatically scroll as the video playback proceeds.

Figure 9:
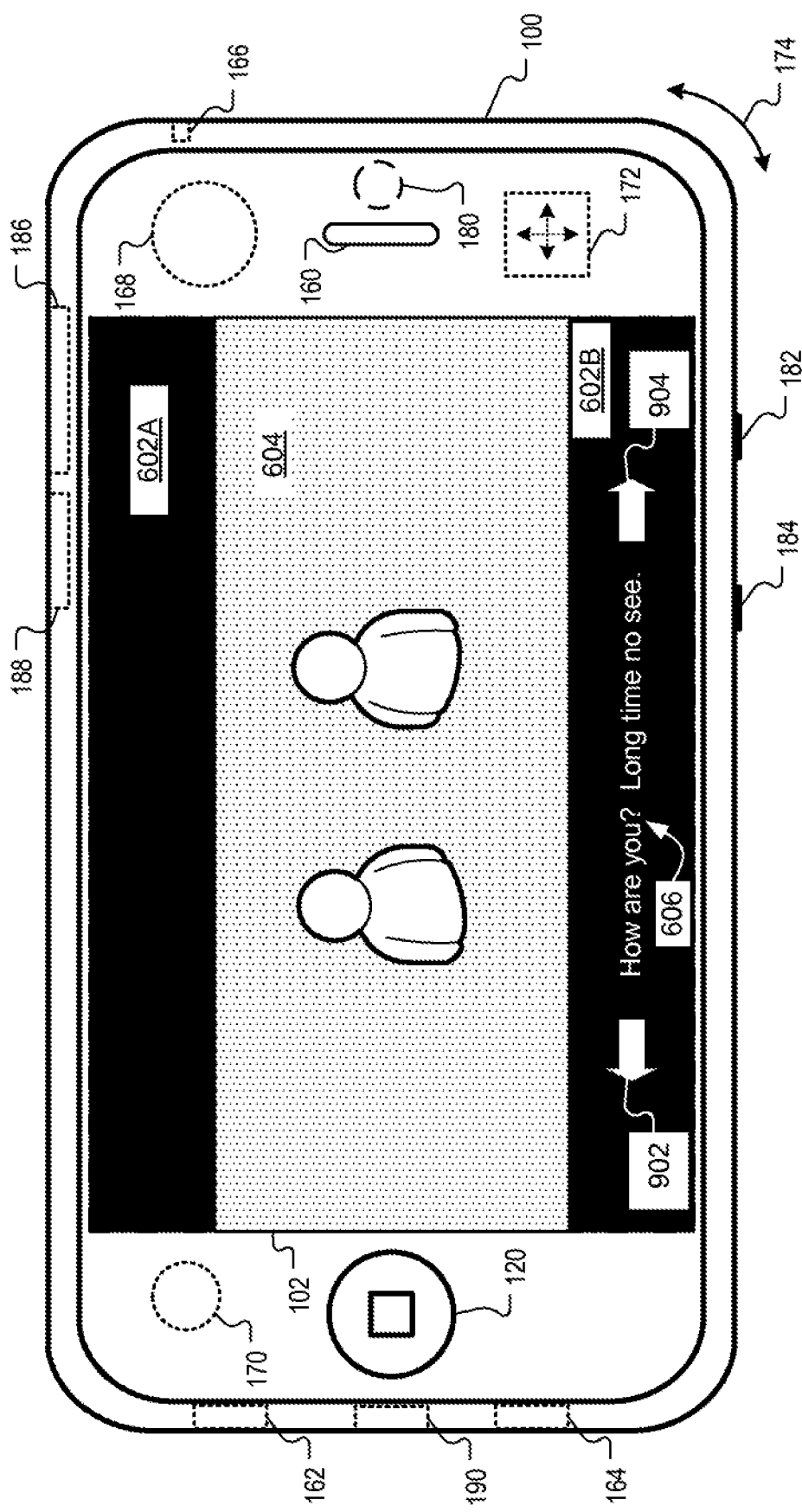
FIG. 9 illustrates an example of letterboxed video with subtitle navigation.

FIG. 9 illustrates an example of mobile device 100 playing a letterboxed video with subtitle navigation or scrolling. In these implementations, video content 604 is detected to be displayed in the center of display 102. Continuing the example, subtitles 606, displayed in matte 602B, can contain multiple lines to be displayed, including lines that are currently displayed and lines that are currently not displayed. The user can, for example, be presented with interface elements 902 and 904 to navigate through or scroll the multiple lines of subtitles 606. The user can, for example, navigate forward through the lines of subtitles 606 with interface element 904 and backward through lines of subtitles with interface element 902. The interface elements 902 and/or 904 can, for example, be display only when there are addition lines in the desired direction. For example, interface element 902 can be shown only where there are lines of subtitles 606 in the backward direction and not be displayed otherwise; interface element 904 can be shown only when there are lines of subtitles 606 in the forward direction and not be displayed otherwise; or any combination of the two interface elements 902 and 904 can be displayed.

In some implementations, a user can operate the interface elements 902 and 904 to navigate the subtitles by double tapping the icon of the interface element 902 or 904. In some other implementations, other methods of navigating the subtitles are possible, such as double tapping the bottom left or right corner of the screen 102 or scrolling a finger along matte 602B in the desired direction, for example. The subtitles 606 can be displayed, for example, in matte 602A and be navigable by scrolling a finger along matte 602B so that the subtitles 606 are not hidden by the users action.

For example, the subtitles for a time position in the video content include the lines "How are you?", "Long time no see.", "How are your wife and kids?", and "They're fine, thanks.", and only the line "Long time no see." is currently displayed. If the user operates interface element 902, the line "Long time no see." is removed from display and the line "How are you?" is displayed. In other words, the user navigates backward through the subtitle lines by operating interface element 902. If, instead, the user operates interface element 904, the line "Long time no see." is removed from display and the line "How are your wife and kids?" is displayed. The user navigates forward through the subtitle lines by operating interface element 904.

In some implementations, lines of the subtitles are associated with a time position in the video content 604. When the user operates interface element 902 or 904 to navigate backward or forward, respectively, through the subtitle lines, playback of the video content 604 is paused and the video content 604 is navigated backward or forward, respectively, to a frame at or in proximity to the time position associated with the newly displayed subtitle line. In other words, in some implementations, the frame of the video content 604 that is displayed is locked to the scrolling of the subtitles. For example, continuing with the example described above, when the line "Long time no see." is currently displayed and the user operates interface element 902, the line "How are you?" is displayed and a frame of the video content at the time position associated with the line "How are you?" is displayed.

In some implementations, multiple lines of subtitles 606 can be displayed in the matte 602B and any lines that do not fit can be presented to the user by selecting the appropriate interface element 902 or 904. For example, if one additional line of the subtitles 606 is not displayed and the user selects forward interface element 904, the top line of the displayed subtitles 606 can be removed and the remaining lines shifted up, in order to make room to display the additional line at the bottom of the matte 602B. This example would display multiple lines of subtitles at a time, removing and adding a single line at a time. Other examples can display multiple lines removing and adding any number of lines at a time.

Figure 10A:
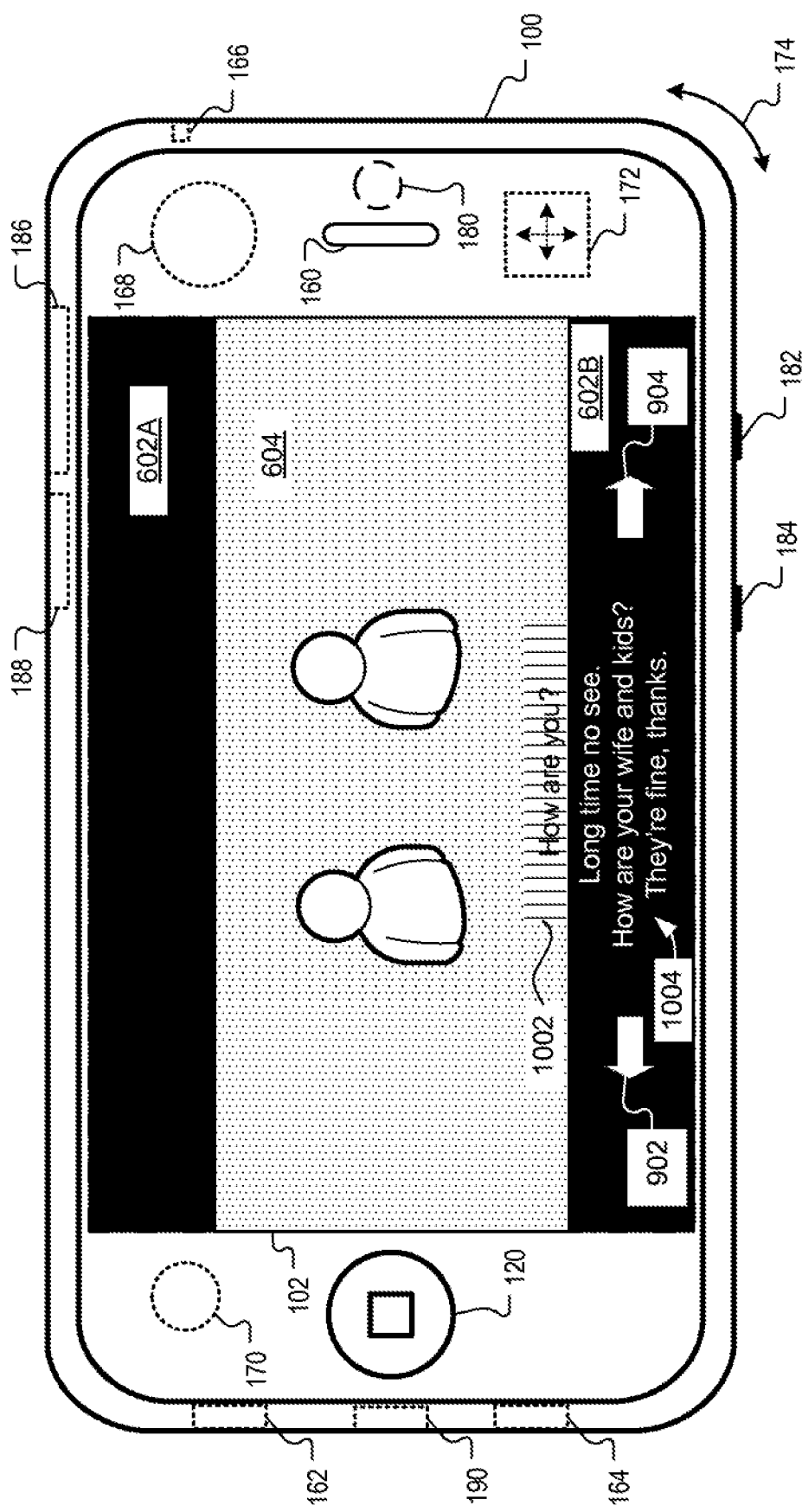
FIGS. 10A-10B illustrate another example of letterboxed video with subtitle navigation.
Figure 10B:
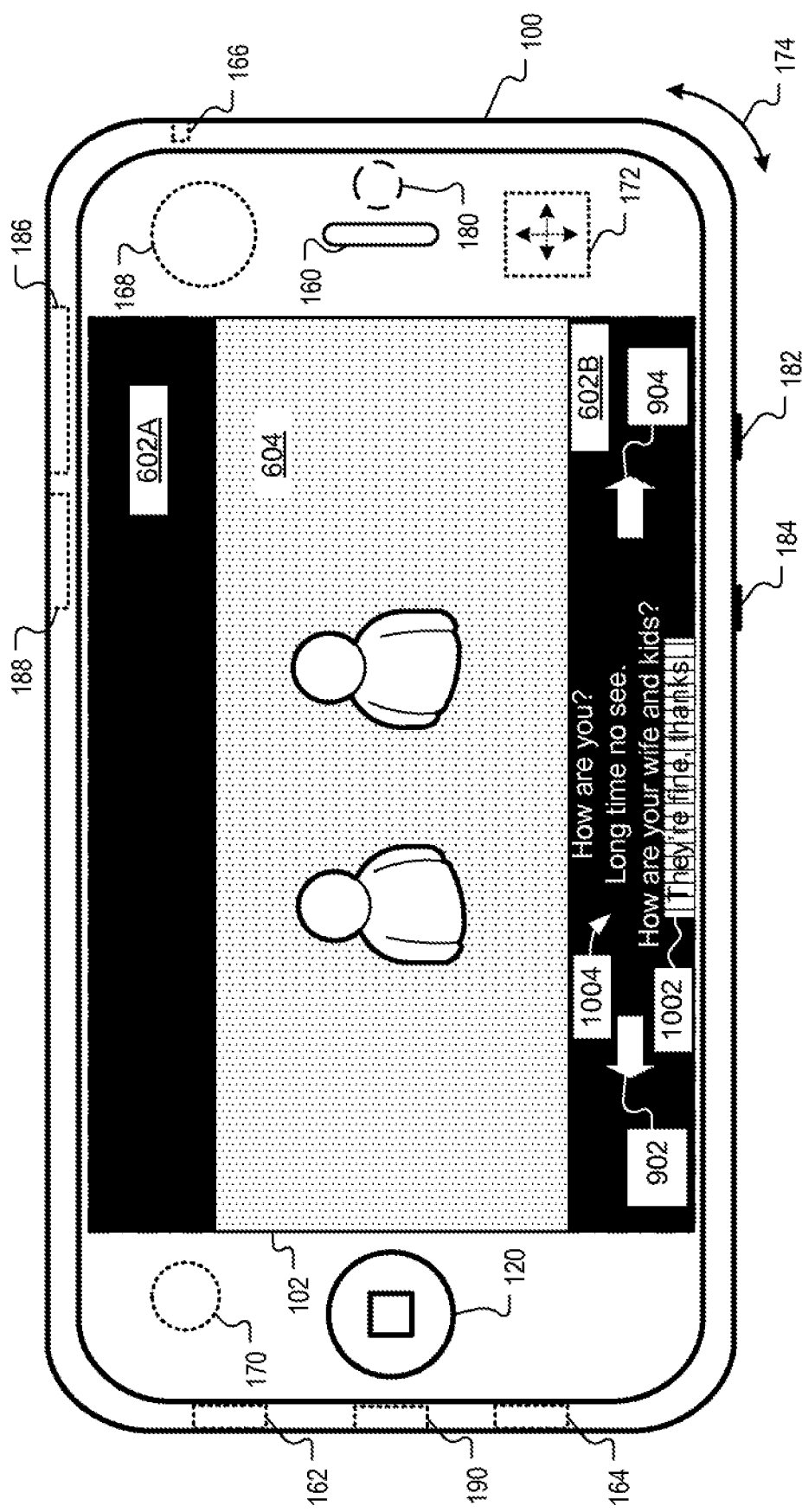

FIGS. 10A and 10B illustrate the shifting of subtitle lines in response to user operation of interface elements 902 or 904 described above. In FIG. 10A, the displayed subtitle lines 1004 include subtitle lines "Long time no see.", "How are your wife and kids?", and "They're fine, thanks." The hidden (i.e., not displayed) subtitle line 1002 includes a subtitle line "How are you?" If the user operates the interface element 902, the subtitles shift downward, so that the line "How are you?" becomes one of the displayed subtitle lines 1004 and the line "They're fine, thanks." becomes the hidden subtitle line 1002, as shown in FIG. 10B. If, at this point, the user operates interface element 904, the subtitle lines shift upward. The line "They're fine, thanks." becomes one of the displayed subtitle lines 1004 and the line "How are you?" becomes the hidden subtitle lines 1002, as it was in FIG. 10A. While reference has been made to directions (e.g., upward and downward), those directions relate to relative time in a sequence. Accordingly, terms such as forward and back can also be used to refer to the navigation of subtitles in a sequence.

In some implementations, the device 100 or 101 can be communicatively coupled to an external display screen (e.g., a television, a computer coupled to a monitor) using a port device 190. For example, the device 100 or 101 can be connected to a dock unit that is communicatively coupled to a computer and which includes an infrared receiver for receiving input from a remote control device. When a video is played back on the device 100 or 101, the remote control device can be used by a user to navigate the subtitles of the video.

In some implementations, a user can search for particular positions in a video by subtitle text. For example, a user can perform a predetermined gesture or enter a predetermined input to bring up a subtitle search field. The user can enter a subtitle query (e.g., a word, phrase, or the like) into the search field. One or more frames and/or chapters (if the video is divided into chapters) corresponding to positions in the video that have subtitles matching the query are identified. The user can select one of the identified frames or chapters to trigger playback of the video from the selected frame or chapter, for example.

Figure 11:
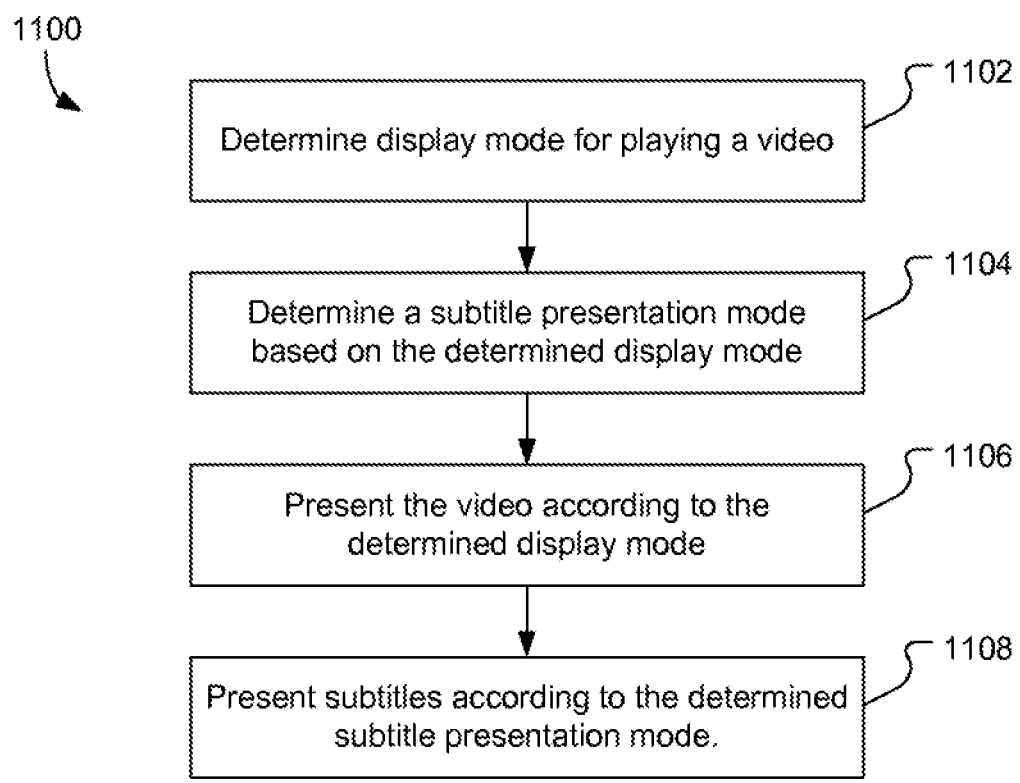
FIG. 11 is another example flow chart of operations to display subtitles for video played on the mobile devices of FIGS. 1A-1B.

FIG. 11 is an example flow chart of operations 1100 that can be performed to display subtitles for video playing on a device. The device, for example, can be mobile device 100 or 101 of FIGS. 1A-1B, some other mobile device, a computer, a television (TV), a DVD player, or some other device. In some implementations, the device can be any device, mobile or not, that has a relative small display screen. The operations 1100 can be performed by a processor executing instructions stored in a computer program product, such as mobile device 100 or 101 executing media processing instructions 366.

The operations 1100 can begin in step 1102 with a determining of a display mode for playing a video on the display of a device. The display mode can be determined based on the original aspect ratio of the video, the aspect ratio of the display of the device, and preferences (e.g., fill the entire display, preserve the aspect ratio of the video, a specific display mode, etc.) set by a user of the device. The determined display mode is one of a plurality of available display modes on the device. Available display modes can include full screen, widescreen, fit to width, fit to height, original aspect ratio, letterbox, and windowbox, to name a few examples. For example, if a video has a 16:9 aspect ration, the display screen of a device has a 4:3 aspect ratios and the user has set a preference that the video aspect ratio be preserved, the device can determine a letterbox display mode for the video.

Determining a subtitle presentation format can be performed in step 1104. The subtitle presentation format is determined based on, among other things, the determined display mode. The determined subtitle presentation format mode is one of a plurality of available subtitle presentation formats associated with the plurality of available display modes. Available subtitle presentation formats include overlaying a subtitle bar over the video, and displaying the subtitle in a matte region, to name a few examples. A subtitle presentation format can be associated with one or more of the available display modes. For example, the format of displaying the subtitle in a matte region can be associated with the letterbox and windowbox display modes, for example.

In step 1106 the video is presented according to the determined display mode. The video is played back in the display of the video according to the determined display mode. For example, if the determined display mode is full screen, the video is played back in the display in full screen mode.

In step 1108 a subtitle, caption, or closed caption is presented according to the determined subtitle presentation format. For example, if the subtitle presentation format is display the subtitle in a matte region, a subtitle is displayed in the matte region as the video is presented.

It should be appreciated that while the implementations described above are described in reference to a mobile device, the described implementations can be implemented on any device, mobile or not, that has a relatively small display screen.

While this specification contains many specifics, these, should not be construed as limitations on the scope of what being claims or of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understand as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments have been described. Other embodiments are within the scope of following claims.

What is claimed is:

1. A method, comprising:
   selecting a video for display on a display of a device;
   detecting a display mode for the video based on an aspect ratio of the video and an aspect ratio of the display of the device;
   presenting subtitles or captions for the video based on the detected display mode; and
   presenting navigation controls to a user, wherein the user can operate the navigation controls to navigate the subtitles or captions,
   wherein the method is performed by one or more processors.

2. The method of claim 1, wherein the detected display mode is selected from a group comprising:
   scaling of the video to vertically fit the display; and
   formatting the video and at least one matte region adjacent to the video for display on the display of the device.

3. The method of claim 2, wherein presenting the subtitles or captions comprises presenting the subtitles or captions in a transparent area overlaid on a video display region in response to the detected display mode requiring scaling of the video to vertically fit the display.

4. The method of claim 2, wherein presenting the subtitles or captions comprises presenting the subtitles or captions in the at least one matte region in response to the detected display mode requiring formatting of the video and the at least one matte region adjacent to the video for display on the display of the device.

5. The method of claim 4, wherein the subtitles or captions are centered within the at least one matte region.

6. The method of claim 4, further comprising:
detecting overflow of a portion of the subtitles or captions from the at least one matte region into a video display region; and
presenting the overflow portion of the subtitles or captions in a transparent area overlaid on the video display region.

7. The method of claim 1, further comprising presenting user interface elements operable to scroll the subtitles or captions.

8. The method of claim 1, further comprising:
receiving a caption query;
identifying one or more positions in the video associated with captions that match the caption query; and
presenting a frame of the video corresponding to one of the identified positions.

9. A device, comprising:
a display;
one or more processors; and
a non-transitory computer-readable medium including one or more sequences of instructions that, when executed by one or more processors, causes:
selecting a video for display on a display of a device;
detecting a display mode for the video based on an aspect ratio of the video and an aspect ratio of the display of the device;
presenting subtitles or captions for the video based on the detected display mode; and
presenting navigation controls to a user, wherein the user can operate the navigation controls to navigate the subtitles or captions.

10. The device of claim 9, wherein the detected display mode is selected from a group comprising:
scaling of the video to vertically fit the display; and
formatting the video and at least one matte region adjacent to the video for display on the display.

11. The device of claim 10, further comprising instructions to present the subtitles or captions in a transparent area overlaid on a video display region in response to the detected display mode being scaling of the video to vertically fit the display.

12. The device of claim 10, further comprising instructions to present the subtitles or captions in the at least one matte region in response to the detected display mode being formatting the video and the at least one matte region adjacent to the video for display on the display.

13. The device of claim 12, wherein the subtitles or captions are centered with the at least one matte region.

14. The device of claim 12, further comprising instructions to:
detect overflow of a portion of the subtitles or captions from the at least one matte region into a video display region; and
present the overflow portion of the subtitles or captions in a transparent area overlaid on the video display region.

15. The device of claim 9, further comprising instructions to present user interface elements operable to scroll the subtitles or captions.

16. The device of claim 10, further comprising instructions to:
receive a caption query;
identify one or more positions in the video associated with a caption that match the caption query; and
present a frame of the video corresponding to one of the identified positions.

* * * * *